(12) United States Patent
Mills et al.

(10) Patent No.: US 7,169,343 B1
(45) Date of Patent: Jan. 30, 2007

(54) METHOD OF MOLDING A REINFORCED NODAL STRUCTURE

(75) Inventors: Andrew Mills, Cranfield (GB); Steven Cousins, Cranfield (GB); Lee Bateup, Cranfield (GB); Robert Backhouse, Cranfield (GB)

(73) Assignee: Coretex Structures Limited, Milton Keynes (GB)

( * ) Notice: Subject to any disclaimer, the term of this patent is extended or adjusted under 35 U.S.C. 154(b) by 0 days.

(21) Appl. No.: 10/069,101

(22) PCT Filed: Aug. 24, 2000

(86) PCT No.: PCT/GB00/03279

§ 371 (c)(1),
(2), (4) Date: Apr. 17, 2002

(87) PCT Pub. No.: WO01/14128

PCT Pub. Date: Mar. 1, 2001

(30) Foreign Application Priority Data

Aug. 24, 1999 (GB) .................................. 9920071.9

(51) Int. Cl.
*B29C 70/46* (2006.01)

(52) U.S. Cl. .................. 264/257; 264/258; 264/313; 264/319; 425/DIG. 14; 156/173

(58) Field of Classification Search ............. 264/257, 264/258, 313, 319; 156/173; 425/DIG. 14
See application file for complete search history.

(56) References Cited

U.S. PATENT DOCUMENTS

| | | | | |
|---|---|---|---|---|
| 3,936,336 A | | 2/1976 | Phillips ................... 156/86 |
| 4,012,549 A | * | 3/1977 | Slysh ....................... 428/116 |
| 4,086,378 A | * | 4/1978 | Kam et al. ................ 428/36 |
| 4,137,354 A | | 1/1979 | Mayes, Jr. et al. ........ 428/116 |
| 4,212,461 A | | 7/1980 | Cecka et al. .............. 273/73 |
| 4,399,992 A | | 8/1983 | Molitor ..................... 273/73 |
| 5,200,251 A | * | 4/1993 | Brand ....................... 428/156 |
| 5,516,271 A | * | 5/1996 | Swenor et al. ............ 425/127 |
| 6,007,894 A | * | 12/1999 | Barnes et al. ............. 428/120 |
| 6,050,315 A | * | 4/2000 | Deckers et al. ........... 156/433 |
| 6,073,670 A | * | 6/2000 | Koury ....................... 156/425 |
| 6,245,274 B1 | * | 6/2001 | Huybrechts et al. ...... 264/257 |

FOREIGN PATENT DOCUMENTS

| | | | |
|---|---|---|---|
| EP | 0 270 462 A | | 6/1988 |
| FR | 2 250 628 A | | 6/1975 |
| FR | 2 462 266 A | | 2/1981 |
| GB | 1 373 344 A | | 11/1974 |
| GB | 2 189 425 A | | 10/1987 |
| JP | 01-166937 | * | 6/1989 |
| JP | 01-316235 | * | 12/1989 |

* cited by examiner

Primary Examiner—Stefan Staicovici
(74) Attorney, Agent, or Firm—Fleshner & Kim, LLP

(57) ABSTRACT

A machine and method for moulding a composite of complex nodal structure includes laying down under CNC a reinforcement (38) of constant cross-section repeatedly into and along channels (26) of a mold (24) and through nodes of the structure, closing the mold, impregnating it with resin and curing the resin.

26 Claims, 8 Drawing Sheets

METHOD OF MOLDING A REINFORCED NODAL STRUCTURE

This application claims priority to PCT/GB00/03279, filed Aug. 24, 2000, Publication No. WO 01/14128 A1 in the English language and which claimed priority to GB Patent Application No. 9920071.9 filed Aug. 24, 1999.

The present invention relates to an apparatus for and method of producing a composite structure and relates particularly, but not exclusively, to the production of vehicle structures and the like. The present invention also relates to a cored reinforcement suitable for making a composite structure.

It is known to produce a composite structure by laying a plurality of fibres onto a first portion of a mould having a desired shape and introducing a resin material either during the laying up process or thereafter in order to ensure the fibres are bonded to each other and produce a component of the desired shape. It is also known to employ a mould having inner and outer portions which, upon assembly, are used to define the external shape of the component to be moulded. Additionally, it is also known to employ an injection technique in which resin is injected or drawn into the mould cavity during the manufacturing process. This injection step facilitates the impregnation of resin material between the fibrous structure and fills the mould cavity thereby to define accurately the final shape of the desired product.

Whilst the above processes provide a perfectly adequate method of manufacturing a composite component it does not lend itself readily to the production of complicated three-dimensional structures. Additionally, some structures can be somewhat bulkier than might be desired, as producing strong and slim corners and joints can be problematic.

A particular problem is met in moulding complex, multi-noded, frame structures such as vehicle frames. Although it is theoretically possible to use the prior art hand lay-up procedures for these costs would be prohibitive; and, again in the context of vehicle frames, crash-resistance and rigidity in the cage formed by the frame for at least the passenger-carrying part of the vehicle, require great care and control in the formation of the joints at the nodes and in how reinforcement is continued through a node to confer coherence and strength.

Furthermore, use of fibres only as reinforcement will lead to a dense and heavy structure. It is known that the reinforcement can take the form of a carbon-fibre-bound foam core of constant cross-section which is of indefinite length and can therefore be fed onto the mould as desired. This gives a more desirable weight/strength ratio. However, there may still be substantial voids between such reinforcement which become filled with resin, and the desired weight to strength ratio may not be reached.

It is an object of the present invention to provide a machine and process for producing a composite structure which lends itself to the moulding of complicated three-dimensional structures.

Accordingly a first aspect of the present invention provides a machine for laying up moulded resin-based structural composite, wherein the composite is a nodal frame, which includes a feed head for cored reinforcement of constant cross-section, means for controlling the feed of the composite from the head and for severing the composite into fed lengths, and means for causing coordinated relative movement between the head and a nodal mould whereby to feed lengths of reinforcement into and along the open mould and through the nodes thereof.

The feeding and coordination will be under CNC (computer numerical control).

The cross-sectional shape of the cored reinforcement need have no relation to the shape of the mould.

The feeding is preferably repeated until the mould is at least filled throughout with the lengths of reinforcement; preferably it is somewhat overfilled so that closure of the mould causes compression of the reinforcement. However, it is not excluded that the mould may be underfilled with the lengths of reinforcement.

In a second aspect of the invention a moulding process for making a nodal frame of composite includes providing a length of cored reinforcement of constant cross-section, repeatedly feeding that reinforcement into and along an open nodal mould for the frame through the nodes thereof, severing the length with shorter lengths as necessary to fill the mould, closing the mould, and curing resin provided around the reinforcement.

The process may include overfilling the open mould, whereby closing the mould compresses the reinforcement. Again, the cross-sectional shape of the reinforcement need have no relation to the shape of the mould.

Another object of the present invention is to reduce the mass of a composite moulded structure or article.

Accordingly in a third aspect of the invention we use as a reinforcement a cored reinforcement with an envelope of strength-giving fibres—most preferably carbon fibres—surrounding a core of expansible (preferably closed cell foam) material. The core is expansible under reduced pressure applied to a closed mould (e.g. to draw resin into the mould) and therefore the finished article contains hardly any or ideally no voids between reinforcements to be occupied by resin; and instead the resin is found exclusively impregnating and encapsulating the strength-giving fibrous structure.

The invention in a fourth aspect therefore provides a method of moulding the composite article which consists of laying in a mould at least one length of reinforcement of constant cross-section (which constant cross-section need have no relation to the shape of the mould), the reinforcement having a core of an expansible (preferably closed cell foam) material, closing the mould, reducing the pressure in the closed mould whereby to cause expansion of the reinforcement to minimise void space within and around the reinforcement, curing resin provided around the reinforcement, and removing the mould. Preferably the strength-giving fibre is carbon fibre. The curing which will be under elevated temperature may have the effect of destroying or partially destroying the foam core.

The result is a cellular structure wherein cured resin encapsulates the reinforcing fibres in such a way as to give a favourable mass to strength ratio because the resin tends to be of higher density than the fibre or, of course, the foam core.

A preferable means and method for laying down the reinforcement in this way, preferably in numerous passes over a nodal mould, are provided by the first and second aspects of the present invention.

The strength-giving fibre envelope may be prepared in any form suitable for the purpose. Particularly suitable is a braided structure. For the expansion characteristic of this process, the braiding need not be symmetrical.

In the second or fourth aspect of the invention the resin may be provided by passing it into the mould (e.g. by injection, or by evacuation to draw the resin into the mould) when the mould is closed. Alternatively the resin may be introduced into the mould as the reinforcement is fed into mould. For example, the resin may be fed into the mould as a powder as the reinforcement is fed into the mould. The powder may then be fused (e.g. by a travelling heater) to prevent it from escaping and/or to tack the reinforcement together.

The present invention will now be more particularly described by way of example only with reference to the accompanying drawings in which.

Figure 1:
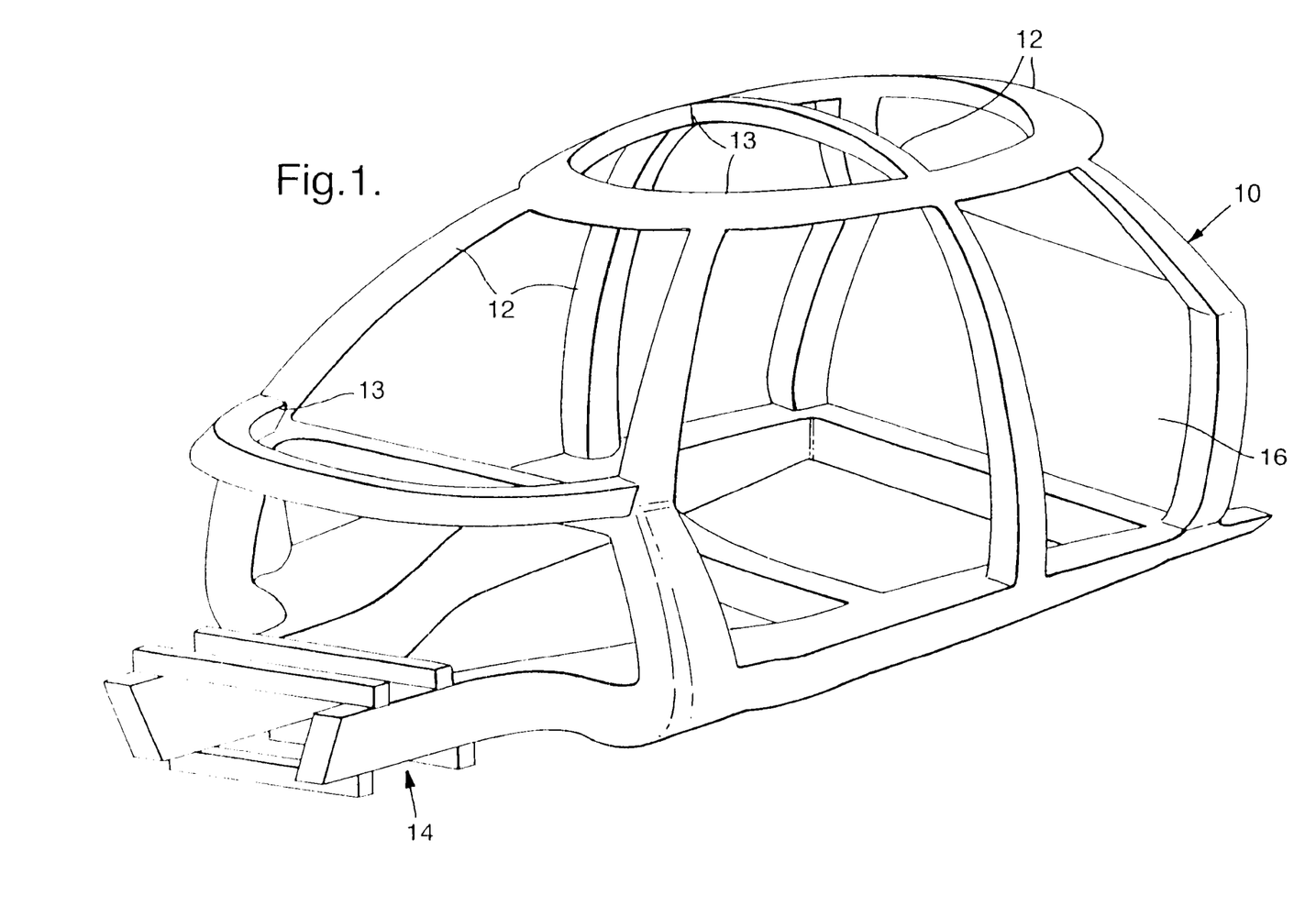
FIG. 1 is an isometric projection of a vehicle substructure which might be produced in accordance with the method and apparatus of the present invention.

Referring now to the drawings in general, but particularly to FIG. 1 it will be appreciated that a composite structure such as a vehicle space frame 10 is complex and not easily manufactured. The structure comprises a number of frame members 12 meeting at nodes 13 and may include subassemblies such as crush subsection 14, and components such as a rear strengthening member illustrated generally at 16. Additionally, features such as hinge, bumper or suspension member mounting points may be provided at other positions on the structure.

If the frame structure is to be made integral a collapsible internal mould part (to be described) will have to be used, however if the frame structure is made in two mirror image parts (i.e. divided along its median plane) a conventional three-dimensional mould may be used. In the latter case the joining together of the separately made halves by adding further layers over the joint can easily be achieved and be very satisfactory.

Figure 2:
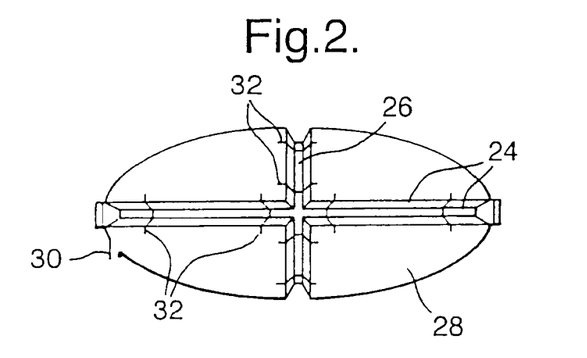
FIG. 2 is a diagrammatic representation of a mould structure.

A simplified form of a collapsible mould structure suitable for creating an integral composite structure of FIG. 1 is shown in FIG. 2. From FIG. 2 it will be appreciated that the mould structure comprises a plurality of linked female mould segments 24 each of which has a channel portion 26 into which the reinforcement is laid during the assembly process described in detail later herein. In an erected position the mould segments 24 act to define the shape of the desired article whilst in a second, collapsed position, they act to allow removal of the moulded article therefrom. In order to facilitate movement between these positions the segments are joined by a reinforced silicone rubber bag 28 which may be inflated by introducing pressurised air or any other suitable fluid through inlet 30, thereby causing the bag to inflate and move the segments 24 to their assembled position. Collapse of the mould segments is achieved by withdrawing the air or other fluid from the bag either by simply releasing it therefrom or by positively withdrawing it. Of course, the shape of the mould here, a simple ovoid, does not correspond with a shape needed for the frame 10, it is given by way of illustration only.

Figure 3A:
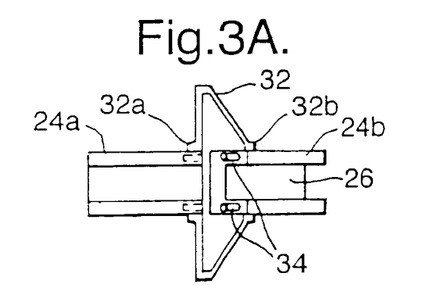
FIGS. 3A and 3B illustrate one possible joint arrangement between segments of the mould structure in top and side view respectively, in an open position.
Figure 3B:
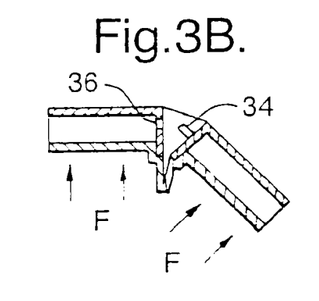
Figure 4A:
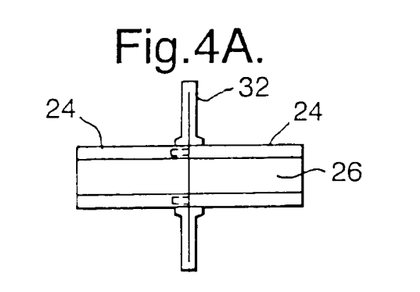
FIGS. 4A and 4B illustrate the arrangement of FIGS. 3A and 3B in closed position.
Figure 4B:
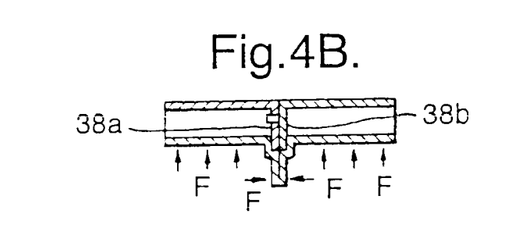

Referring now more particularly to FIGS. 3 and 4, the segments 24 are jointed together by means of hinge means shown generally at 32. In the particular example the hinge means comprises a flexible web member having a first portion 32a fixedly attached to first segment portion 24a and second portion 32b fixedly attached to an adjacent segment portion 24b. The flexible web portion 32 locates each segment 24 relative to its neighbour whilst providing sufficient flexibility for the segments to move between their two positions. In a simplified arrangement the hinge means may comprise a flexible material which forms the pressurising bag 28. Also shown in FIGS. 3 and 4 are locating means in the form of, for example, tapered pins 34 and associated holes 36 provided on adjacent flange portions 38a, 38b of adjacent mould segments 24a, 24b. Operation of the pressurising means 28 will cause the hinged segments to be moved into interlocking relationship with each other in view of the fact that the pressurising force will be applied in the direction of arrows F of FIGS. 3 and 4. The force causes the segments to hinge relative to each other into their closed position and ensures the security of the hinged joint.

The segments 24, once erected, act to define a mould structure onto which the composite material may be laid down, as will be described later.

Figure 5:
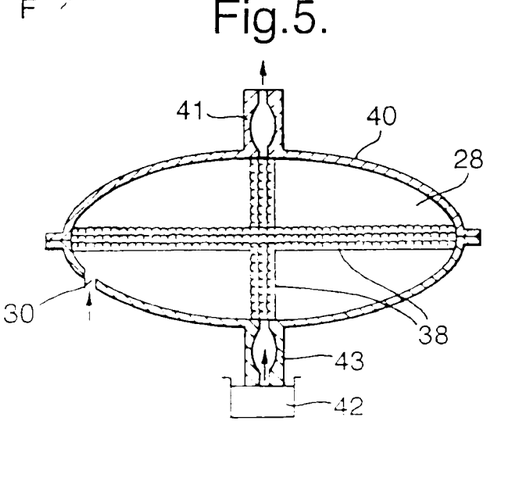
FIG. 5 illustrates an encapsulation step with introduction of resin into the interior of the mould structure.

Closure and injection steps are illustrated by reference to FIG. 5 from which it will be appreciated that a second part 40 of the mould is brought in to enclose the laid down material 38 and is then secured in position by any suitable means. It will be appreciated that whilst FIG. 5 illustrates a total encapsulation type arrangement one need only actually enclose the portions containing the laid down material and, consequently, the mould part 40 need not provide a total enclosure. In order to facilitate the rapid assembly of the cooling one might employ pneumatic or robotic actuation systems (not shown) which move the second portion or portions 40 of the mould into position and retain them there during the subsequent steps. The act of introducing the second portion 40 preferably causes the reinforcement to be compressed and ensures the fibre structure and any inserts in it are kept still during the subsequent impregnation step. The second portion 40 of the mould is preferably coated with a silicone layer to aid sealing during infusion and release once the component has been cured. By applying a vacuum to the interior of the mould via outlet 41 one can draw resin material from reservoir 42 into the interior of the mould and cause it to pass along the strands of the fibre of the reinforcement via resin inlet 43, thereby passing between and coating the fibre with the resin, which also acts to define the outer surface of the finished article in view of the fact that it contacts the surface of the mould structure itself. The use of a vacuum step is preferred over that of a resin injection step under positive pressure as the vacuum makes the job of sealing significantly easier and reduces loads on the tooling associated with the mould process. Whilst not absolutely necessary, it will be appreciated that a small additionally internal pressure may be applied to the pressurising means 28 to help ensue that the segments 24 seal against the second portion of the mould.

Once the resin is injected, the resin is cured at elevated temperature and the second portion 40 of the mould is removed and the pressurising means deflated for the extraction of the completed space frame such as 10. Any mould debris is removed from the space frame and the tooling is then cleaned and prepared to re-use once again. Of course, if the frame is made in halves, the mould channels 26 may be on a permanent, rigid, mould half.

Figure 6:
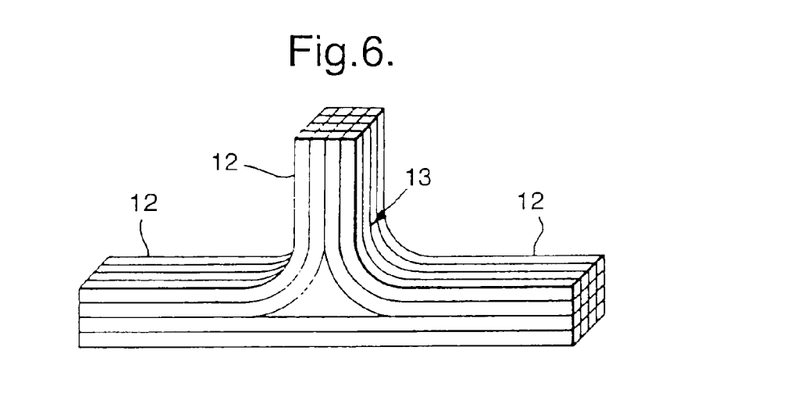
FIG. 6 illustrates a node within the composite structure.

Referring now to FIG. 6, it will be appreciated that nodes 13 may be produced by introducing diverting inserts in the form of sections thereby to divert a portion of the reinforcement around the corner created by said section so that the lengths of reinforcement pass from one frame part 12 to another continuously through the node 13.

Figure 7:
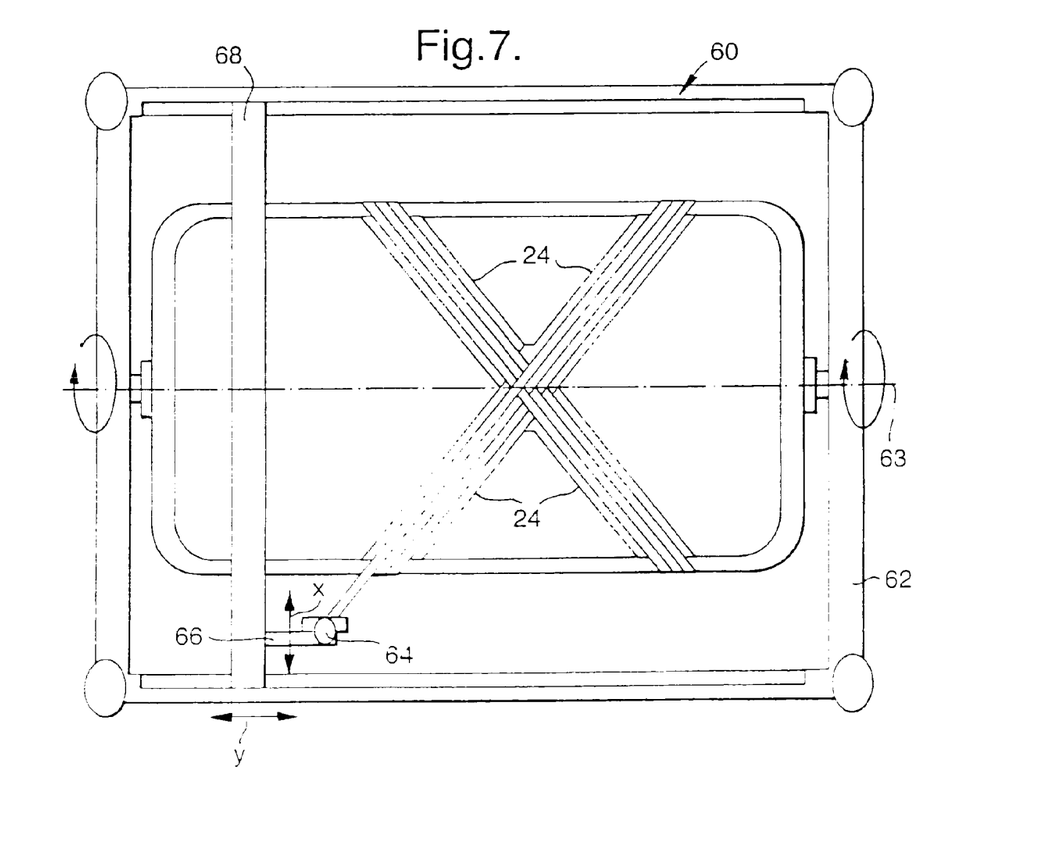
FIGS. 7 and 8 illustrate in side view a machine suitable for laying down reinforcement into a mould structure.

FIG. 7 illustrates in a very simplified form a machine suitable for laying reinforcement onto the mould structure. The machine 60 comprises a support frame 62 having a reinforcement supply head 64, to be described in more detail later, mounted onto a two-axis positioning head 66. The head 66 is mounted on and translatable—arrow X—along bridging member 68 which is, itself, translatable—arrow Y—along frame 62 so as to move in two dimensions. An ovoid mould structure formed of segments 24 is mounted for rotation about a longitudinal axis 63 of the frame 62 such that, on controlled translation of the feed head 64 and rotation of the mould structure it is possible to deposit the reinforcement into the channel 26 of the mould by laying it on and along that channel. This Figure also illustrates the crossover or inter meshing relationship at nodes 13 of the frame thereby to increase the rigidity of the finished frame. A programmable CNC is provided to control the movement of the support frame 62 and feed head 64.

Control of the coordination of the movement of the mould and the feeder head so as to achieve laying-down of reinforcement in the channels will normally be by the CNC, programmed for the particular frame, ie the particular mould being used: CNC will also determine the rate of feed of reinforcement from the head and if discrete lengths of it are to be placed, for example through a node or at a zone where particularly high stress is expected.

Figure 8:
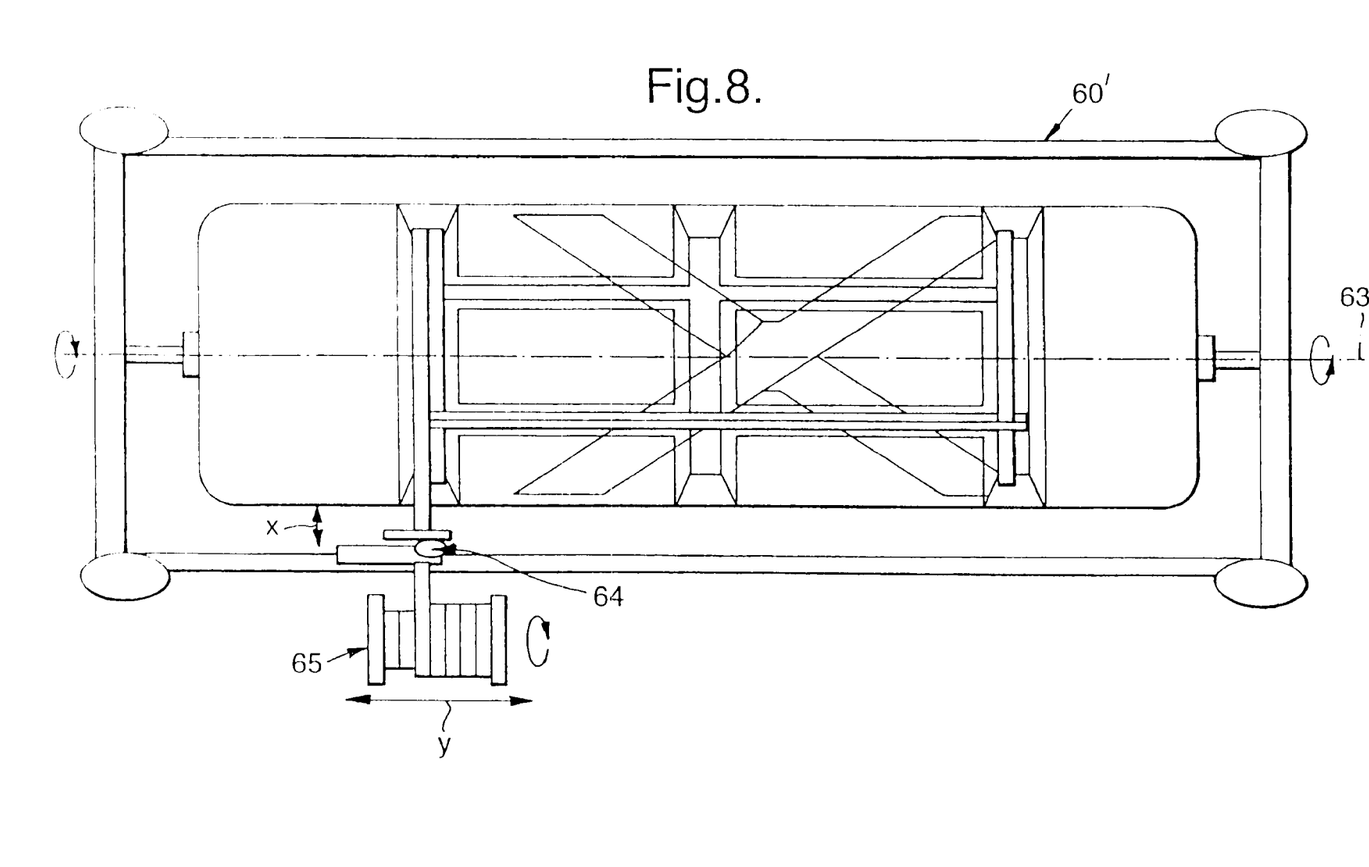

FIG. 8 shows a second such machine 60', with a feeder head 64 to which reinforcement comes from a roll 65 carried with the head (in other embodiments, however, the roll may be immobile or independently movable). As before, the head 64 can execute longitudinal or lateral movements over a mould structure, here generally mounted for rotation on axis 63. Under the control of a CNC, reinforcement can be laid down either continuously or in discrete lengths along the grooves or the mould structure until these are full or slightly overfull.

Both FIGS. 7 and 8 have dealt with a fully rotatable mould structure, it is clear however that the mould structure may be stationary, with the feeder head adapted under CNC to move additionally in a Z axis orthogonal to the X and Y arrows, and/or can partially rotate (reciprocate). This will be the case, usually, when the frame to be formed by the machine and process is such as not to require a collapsible mould structure.

Figure 9:
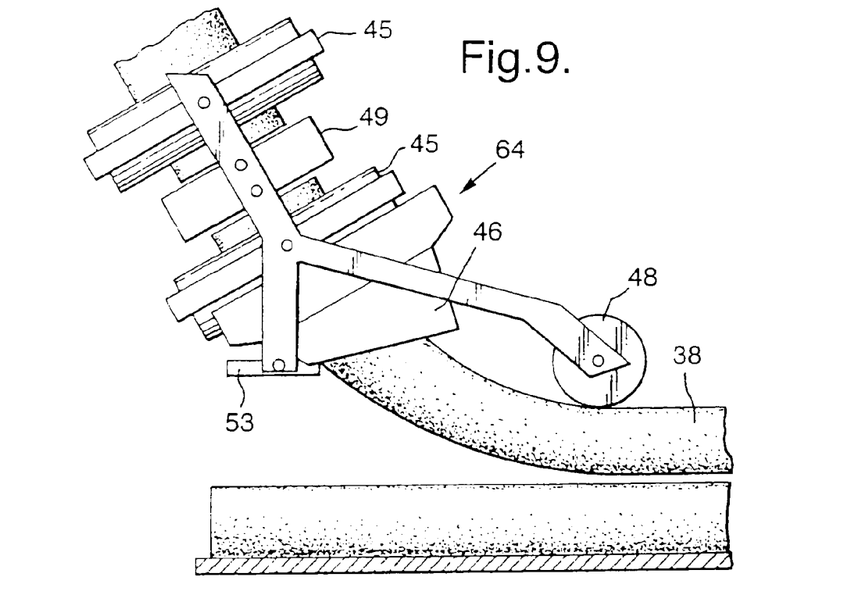
FIG. 9 is a front view of a feeder head of the machine.
Figure 10:
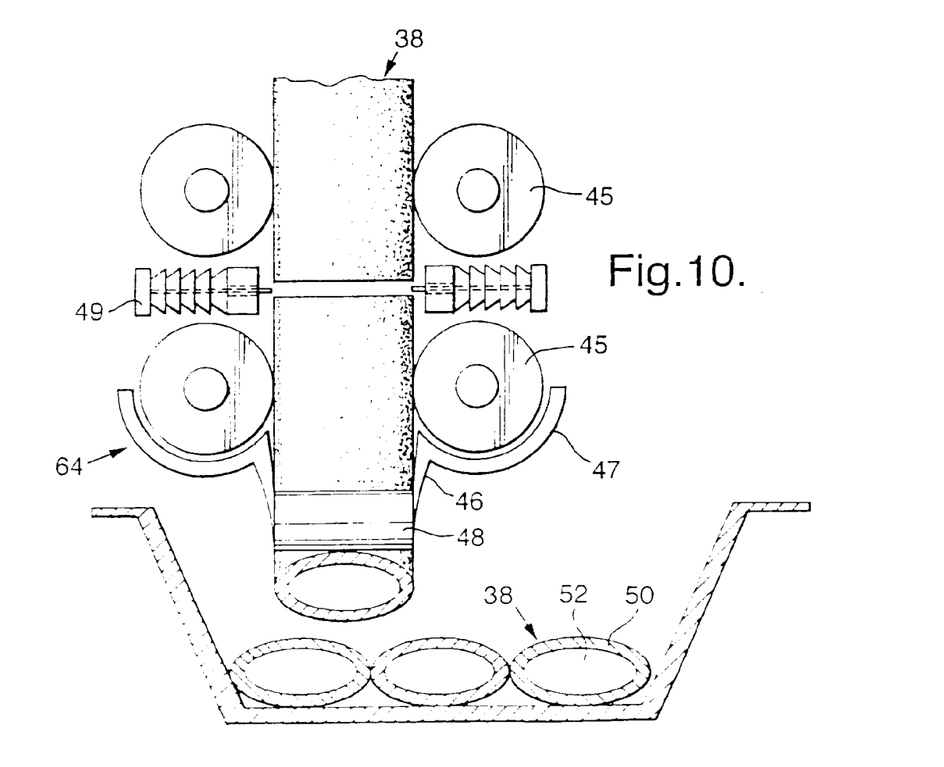
FIG. 10 is a side view of the feeder head of the machine.
Figure 11:
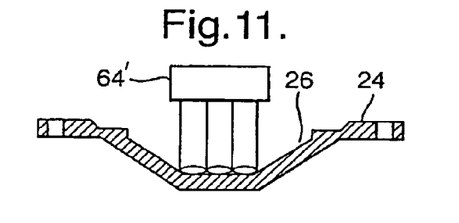
FIGS. 11–18 illustrate various steps involved in the manufacture of a moulded structure in accordance with the present invention.
Figure 12:
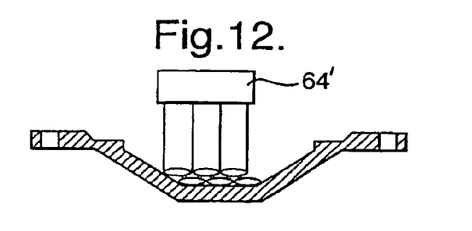
Figure 13:
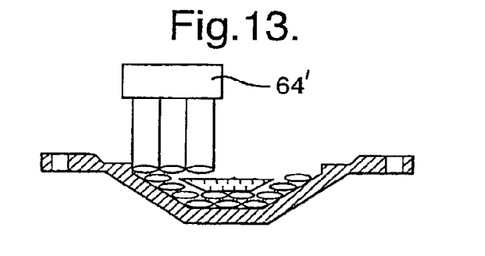

FIGS. 9 and 10 shows the feeder head 64. Reinforcement 38 from the roll 65 or other source is taken by driven feed rollers 45 at a required rate through nozzle 46 with guide wings 47. Reinforcement issuing from the nozzle is pressed into the base of channel 26, or on to a preceding layer of reinforcement, by pressure roller 48. Cutter 49, which like feed rollers 45 is under CNC control, can operate to sever discrete lengths of reinforcements.

Figure 14:
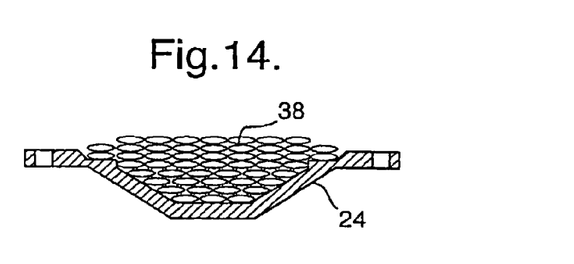
Figure 15:
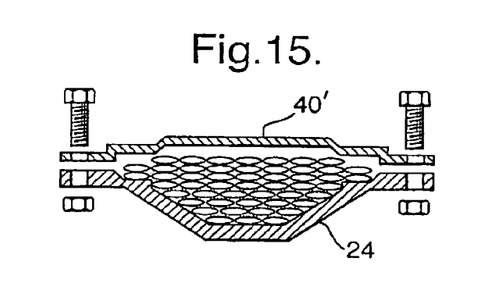
Figure 16:
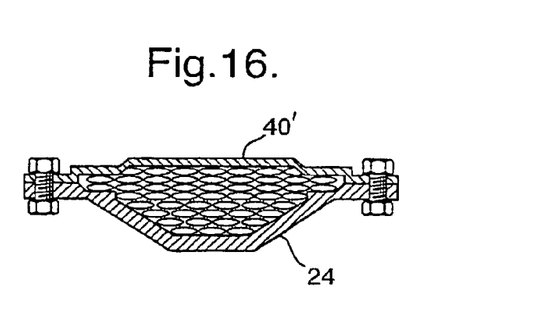
Figure 17:
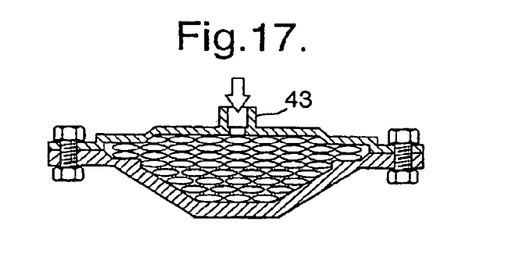
Figure 18:
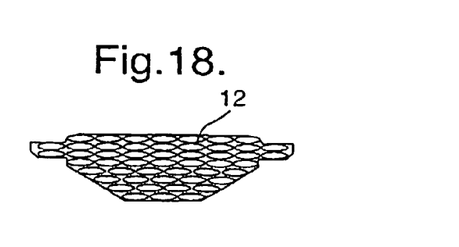

The reinforcement 38 comprises carbon fibre filament 50 surrounding a central core 52 which, in a preferred arrangement, comprises a compressible core such as a foam material. As described later, in respect of FIGS. 19–23, the reinforcement in a particularly preferred arrangement has an expansible closed cell foam core. It will, however, be appreciated that flexible or non-compressible cores may be used to advantage. Powdered fusible binder is carried on or in the carbon fibre cover 50. A pulsed infrared heater 53 fuses binder on the surface of any preceding layer of reinforcement to tack the newly applied layer in place under closure of the mould and impregnation, as will be described with reference to FIGS. 11–18. Whilst the majority of the reinforcement is wound continuously it will be appreciated that this winding process may be stopped and then recommenced at any position of the mould structure such that localised areas may be provided with additional composite material in order to improve the strength of that portion. In addition to the deposition of discrete lengths of reinforcement it is possible to incorporate additional fabric, foam and metal inserts into the would structure as the reinforcement is supplied thereto (such inserts can also, however, be added when winding is complete). Such additions serve to enable the structure to withstand large or localised loads during use and/or provide mounting points for components which must be mounted to the basic mould structure. As showed in FIGS. 11–18, the mould structure is filled with the feedstock from feeder head 64 (here shown as delivering a plurality of reinforcements at one pass) whilst at the same time introducing any additional inserts and the mould is then overfilled by a small amount (FIG. 14) so that when the mould is closed by second mould part 40' (FIGS. 15 and 16) the reinforcement is compressed. Resin is then fed in, preferably by vacuum impregnation (FIG. 17), to impregnate the voids, and is cured. The mould parts 24, 40' are removed leaving the formed frame member 12.

Figure 19:
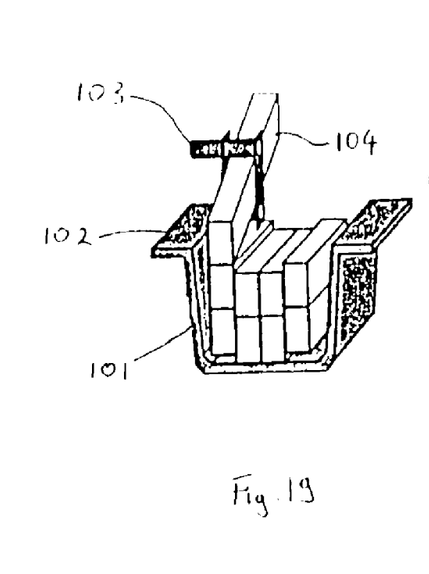
FIGS. 19–21 are lateral sections through a mould showing successive stages of loading.

FIG. 19 shows the channel 101 of a mould part 102 being loaded by a feeder head 103 (such as the one described above in respect of FIGS. 9 and 10) with successive layers of constant cross-section reinforcement 104. The reinforcement here is shown as rectangular cross-section; this is diagrammatic and normally it would be circular or oval in cross-section, with an comparatively soft, expansible, closed cell plastics material foam core enwrapped by an envelope of strength-giving fibres. Particularly suitable for such fibres are carbon fibres and they may be arranged in a braid around the core.

Figure 20:
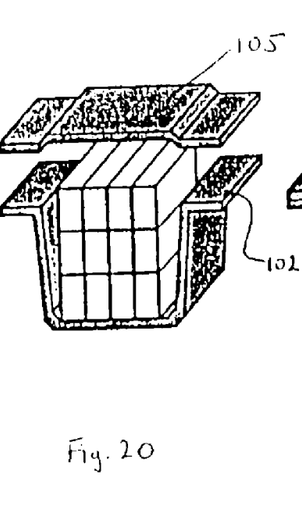
Figure 21:
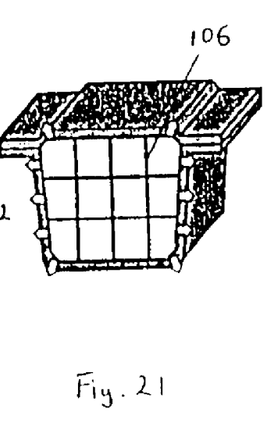
Figure 22:
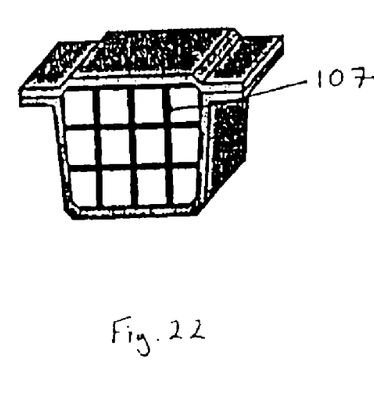
FIG. 22 is the same after impregnation and cure.
Figure 23:
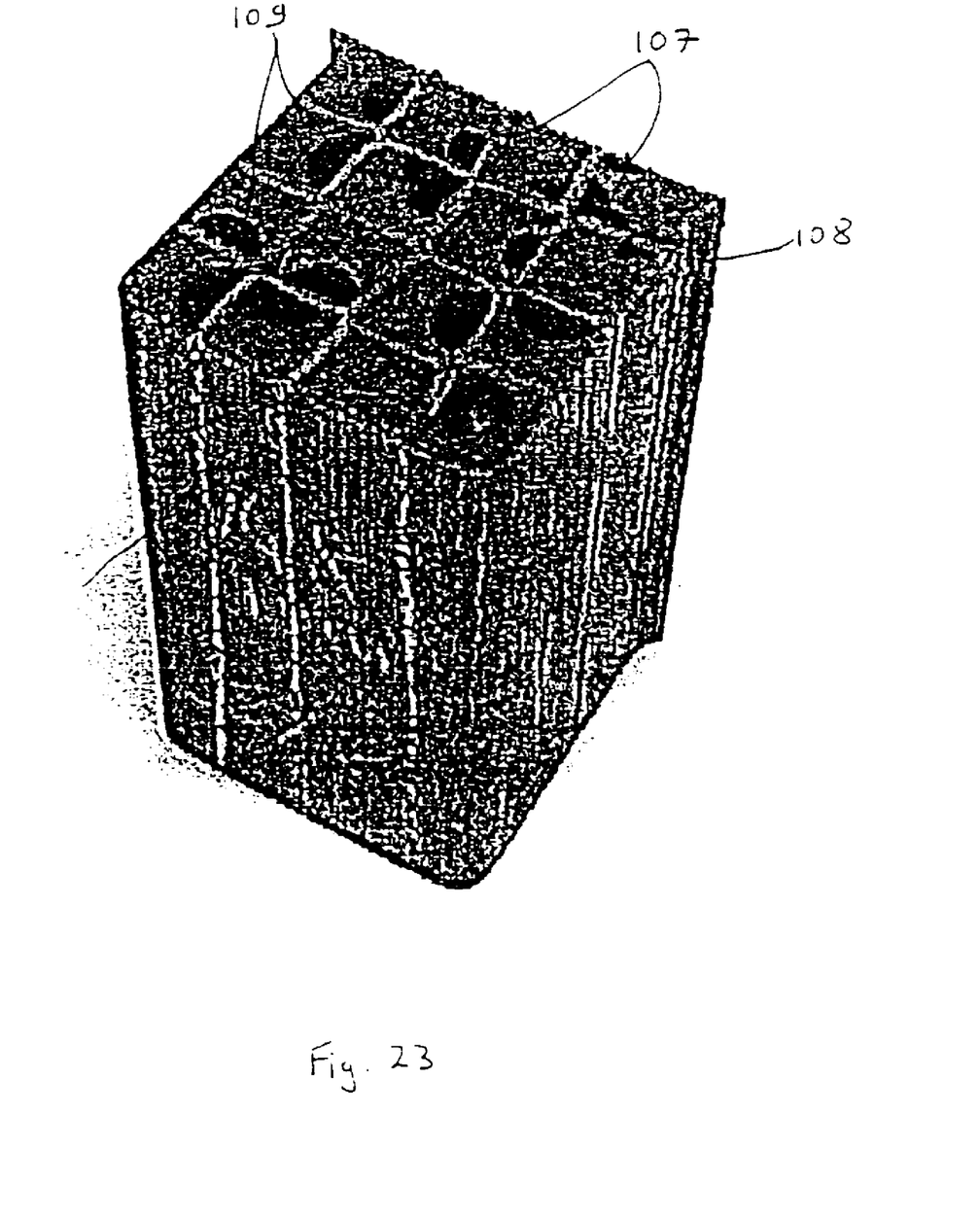
FIG. 23 is a perspective view and section of a composite prepared according to the process.

The reinforcement is fed in until the channel is sufficiently full, then as seen in FIG. 20 a second part 108 of the mould is placed on and sealed to it. In FIG. 21, reduced pressure is applied to the mould to draw resin into it. The resin cannot permeate the closed cell foam core and is instead drawn along the channels formed by the fibre covers of the various lengths of reinforcement. At the same time, the reduced pressure causes an expansion of the foam cores so that the voids between the reinforcements are substantially or even entirely eliminated, leaving only a comparatively thin network or honeycomb 106 of walls of reinforcing fibre impregnated with resin. This is shown schematically in FIG. 22 where the presence of a resin is indicated by thickened honeycomb lines 107. In the process of curing, which is at an elevated temperature, the foam core of the reinforcement may be partially or even completely destroyed or melted but this is of no importance. What is left, as seen in FIG. 23, is a honeycomb rigid-walled complete beam structure 108 of very satisfactory strength to weight ratio. Voids where the foam has been destroyed are seen in the darkened areas such as 109.

This construction and type of reinforcement can be used in complex nodal structures, as described above in respect of FIGS. 1–18, with the reinforcement being taken through the nodes so as to form an integral structure not requiring the making of joints.

The invention claimed is:

1. A method of moulding a reinforced nodal structure, comprising:
    depositing a cored reinforcement in and along channels of a nodal mould and across nodes of the nodal mould by repeated passed along the channels to at least partially fill the channels, the cored reinforcement comprising an envelope of strength-giving fibers surrounding a core of expansible material of substantially constant cross section;
    closing the mould;
    expanding the core of expansible material so as to cause the envelope of strength giving fibers to adapt to a shape of a corresponding portion of the channel; and
    curing resin provided around the cored reinforcement; and
    providing the reinforced nodal structure comprising a cellular structure formed from a network of walls formed by the strength-giving fibers impregnated with resin.

2. The method according to claim 1, wherein the cored reinforcement comprises an expansible foam core surrounded by a braided carbon fiber material.

3. The method according to claim 1, wherein depositing the cored reinforcement comprises overfilling the channels, and wherein closing the mould comprises compressing the cored reinforcement.

4. The method according to claim 1, wherein depositing he cored reinforcement comprises moving a feeder head relative to the mould and controlling a feed of the cored reinforcement under computer numerical control (CNC).

5. The method according to claim 4, further comprising severing lengths of the cored reinforcement in the feeder head under CNC.

6. The method according to claim 1, wherein depositing the cored reinforcement further comprises thermally tacking a layer of cored reinforcement to a preceding layer of cored reinforcement.

7. The method according to claim 1, further comprising introducing at least one insert in the mould to locally divert the reinforcement, to provide localized strengthening, and/or to provide a mounting point.

8. The method according to claim 1, further comprising incorporating fabric inserts into the mould by at least one member selected from the group of before, during and after depositing the cored reinforcement of substantially constant cross section in the mould.

9. The method according to claim 8, wherein incorporating fabric inserts into the mould comprises incorporating fabric inserts along the channels of the nodal mould and across the nodes of the nodal mould, wherein the fabric inserts extend in a longitudinal direction along at least one cored reinforcement of substantially constant cross section in the channel.

10. The method according to claim 9, wherein at least one fabric insert is positioned over a plurality of cored reinforcements of substantially constant cross section.

11. A method of moulding a reinforced nodal structure, comprising:
    depositing a cored reinforcement in and along channels of a nodal mould and across the nodes formed in the nodal mould by repeated passes along the channels to at least partially fill the channels;
    incorporating at least one insert in addition to the cored reinforcement along the channels of the nodal mould;
    closing the mould;
    expanding an expansible core portion of the cored reinforcement, the expansible core portion being of substantially constant cross section, so as to cause an envelope of strength giving fibers surrounding the expansible core portion to adapt to a shape of a corresponding portion of the channel; and
    curing resin provided around the cored reinforcement, wherein the at least one insert extends in a longitudinal direction along at least one cored reinforcement in the channel.

12. The method of claim 11, wherein the at least one insert is a fabric insert that extends across a node formed in the nodal mould.

13. The method according to claim 12, wherein the at least one fabric insert is incorporated according to at least one member selected from the group of before, during and after depositing the cored reinforcement of substantially constant cross section in the mould.

14. The method of claim 12, wherein the at least one fabric insert is positioned over a plurality of cored reinforcements of substantially constant cross section.

15. The method of claim 1, wherein expanding the core of expansible material comprises controlling expansion of the core of expansible material based on a pressure or a temperature in the mould.

16. The method of claim 15, wherein controlling expansion of the core of expansible material comprises reducing a pressure in the mould.

17. The method of claim 15, wherein controlling expansion of the core of expansible material comprises increasing a temperature in the mould.

18. The method of claim 1, wherein expanding the core of expansible material comprises adjusting a shape of the envelope of strength-giving fibers to correspond to an internal shape of a corresponding portion of the channels in which the cored reinforcement is deposited.

19. The method of claim 18, wherein the envelope of strength-giving fibers comprises a braided carbon fiber material.

20. The method of claim 18, wherein the core of expanded material is expanded until shape of the envelope of strength-giving fibers is substantially conformal to the channels in which the cored reinforcement is deposited.

21. The method of claim 20, wherein the channels in which the cored reinforcement is deposited are of non-constant cross section, and wherein expanding the core of expansible material and curing resin provided around the reinforcement provides a reinforced nodal structure with a non-constant cross section.

22. The method of claim 20, wherein expansion of the core of expansible material is limited by the internal shape of the corresponding portion of the channel.

23. The method of claim 11, wherein expanding the expansible core portion of the cored reinforcement comprises controlling expansion of the expansible core portion based on a pressure in the mould.

24. The method of claim 11, wherein expanding the expansible core portion of the reinforcement comprises adjusting a shape of the envelope of strength-giving fibers to correspond to an internal shape of a corresponding portion of the channels in which the cored reinforcement is deposited.

25. The method of claim 24, wherein the expansible core portion is expanded until the shape of the envelope of strength-giving fibers is substantially conformal to the channels in which the reinforcement is deposited.

26. The method of claim 25, wherein the channels in which the reinforcement is deposited are of non-constant cross section, and wherein expanding the expansible core portion and curing resin provided around the reinforcement provides a reinforced nodal structure with a non-constant cross section.

* * * * *